United States Patent [19]
Friese et al.

[11] Patent Number: 5,709,786
[45] Date of Patent: Jan. 20, 1998

[54] SINTERED SOLID ELECTROLYTE HAVING A HIGH OXYGEN-ION CONDUCTIVITY

[75] Inventors: Karl-Hermann Friese, Leonberg; Werner Gruenwald, Gerlingen, both of Germany

[73] Assignee: Robert Bosch GmbH, Stuttgart, Germany

[21] Appl. No.: 433,460

[22] PCT Filed: Oct. 23, 1993

[86] PCT No.: PCT/DE93/01009

§ 371 Date: Feb. 6, 1996

§ 102(e) Date: Feb. 6, 1996

[87] PCT Pub. No.: WO94/11322

PCT Pub. Date: May 26, 1994

[30] Foreign Application Priority Data

Nov. 17, 1992 [DE] Germany .................. 42 38 688.8

[51] Int. Cl.⁶ .................................................. G01N 27/26
[52] U.S. Cl. .................. 204/421; 204/295; 205/344; 429/33; 429/40; 429/41; 429/44; 429/193; 501/103; 501/152
[58] Field of Search ........................ 501/103, 152; 204/421, 295; 429/33, 40, 41, 44, 193; 205/344

[56] References Cited

U.S. PATENT DOCUMENTS

| | | | |
|---|---|---|---|
| 4,130,693 | 12/1978 | Van Dea Berghe et al. | 429/41 |
| 4,793,904 | 12/1988 | Mazanec et al. | 205/344 |
| 5,122,425 | 6/1992 | Yoshida et al. | 429/41 |
| 5,137,615 | 8/1992 | Friese et al. | 204/424 |
| 5,155,071 | 10/1992 | Jacobson | 501/103 |

FOREIGN PATENT DOCUMENTS

| | | |
|---|---|---|
| 0134136 | 3/1985 | European Pat. Off. . |
| 0339366 | 11/1989 | European Pat. Off. . |
| 0345824 | 12/1989 | European Pat. Off. . |
| 0421077 | 4/1991 | European Pat. Off. . |
| 2837593 | 4/1979 | Germany . |
| 2852638 | 6/1980 | Germany . |
| 91/09430 | 6/1991 | WIPO . |

OTHER PUBLICATIONS

H. Gleiter: "Nanostrukturierte Materialien". In: Phys. Bl. 47, 1991, No. 8, pp. 753–759, No month available.

S.D. Ramamurthi et al.: "Nanometer-Sized $ZrO_2$ Particles Prepared by a Sol-Emulsion-Gel Method". In: J.Am. Ceram. Soc. 73, 1990, pp. 2760–2763, No month available.

S.-C. Zhang et al.: "Synthesis of Solid, Spherical Zirconia Particles by Spray Pyrolysis". In: J. Am. Ceram. Soc. 73, 1990, pp. 61–67, No month available.

D.W. Strickler et al.: "Electrical Conductivitiy in the $ZrO_2$-Rich Region of Several $M_2O_3$–$ZrO_2$ Systems". In: Journal of the American Ceram. Society, vol. 48, No. 6, pp. 286–289, No month or year available.

*Primary Examiner*—Bruce F. Bell
*Attorney, Agent, or Firm*—Spencer & Frank

[57] ABSTRACT

A sintered layer system, includes an ion-conductive solid electrolyte layer which has a high oxygen ion conductivity and which is comprised of a solid electrolyte material comprising at least one oxide of tetravalent metals and at least one stabilizer oxide; and at least one functional layer which comprises a mixture of the solid electrolyte material and at least one further material, wherein the solid electrolyte material of the ion-conductive solid electrolyte layer and the solid electrolyte material of the at least one functional layer are comprised of nanocrystallites having a mean diameter of <100 nanometers.

9 Claims, No Drawings

SINTERED SOLID ELECTROLYTE HAVING A HIGH OXYGEN-ION CONDUCTIVITY

BACKGROUND OF THE INVENTION

This application is a 371 of PCT/DE93/01009 filed Oct. 23, 1993.

Metal oxides having oxygen-ion conductivity are known to be used, inter alia, in sensors by means of which the composition of gas mixtures, such as exhaust gases from internal combustion engines, is determined. However, the conductivity of the metal oxides such as zirconium(IV) oxide, hafnium(IV) oxide or cerium(IV) oxide which are customary for this purpose and are stabilized, for example, with magnesium oxide or calcium oxide is unsatisfactory.

It is known that the oxygen-ion conductivity of these metal oxides can be increased by addition of certain oxides of trivalent and/or divalent metals. In the case of zirconium (IV) oxide, for example, scandium(III) oxide, yttrium(III) oxide and the oxides of the heavy rare earths, such as erbium, dysprosium and ytterbium, are effective for this purpose. These additives are also known as stabilizers, because they stabilize the cubic phase of the zirconium(IV) oxide at low temperatures and/or maintain the tetragonal phase in a metastable state at low temperatures. Both phases have a pronounced oxygen-ion conductivity. The relationship between the type and amount of the stabilizer on the one hand and ion conductivity on the other hand is described, for example, by D. W. Strickler and W. G. Carlson in "Electrical Conductivity in the $ZrO_2$-Rich Region of Several $M_2O_3$—$ZrO_2$ Systems", J. Am. Ceram. Soc., Vol. 48 (1974), 286, 288.

There is an optimum for the molar ratio of the stabilizer to zirconium(IV) oxide (cf. FIG. 3 in the cited work). One then speaks of full stabilization. However, partially stabilized zirconium(IV) oxide having a lower stabilizer content has also been used in gas sensor technology (DE-A2-28 52 638).

SUMMARY OF THE INVENTION

The sintered solid electrolytes of the invention which have a high oxygen-ion conductivity can be used alone, i.e. in thin solid electrolyte layers, or else in combination with other functional elements, for example with metal particles in the form of cermet electrodes. These are produced, as is known, by cosintering of metallic and ceramic particles and have a cohesive, electron-conducting layer of metal particles which is embedded in a likewise cohesive support framework of ceramic particles having oxygen-ion conductivity.

The solid electrolytes of the invention have, over wide temperature ranges, a significantly higher ion conductivity than solid electrolytes made from starting powders having a coarser particle structure. Gas sensors using these solid electrolytes, for example the λ sensors customary for internal combustion engines, therefore operate reliably and reproducibly even at temperatures below 300° C. for example at from 150° to 200° C. This is important in the phase directly after starting the engine, when the usual high exhaust gas temperature has not yet been reached.

Furthermore, the solid electrolytes of the invention have a lower temperature dependence of the conductivity than comparable electrolytes made of starting powders having a coarser crystal structure. This is due to the increased proportion of the oxygen-ion transport in the grain boundaries of the nanocrystalline zirconium(IV) oxide with the reduced activation energy $Q_{GB}$ of grain boundary diffusion ($Q_{GB}$=0.5 $Q_{lattice}$).

Owing to the increased conductivity of the solid electrolytes and/or a reduced polarization of the cermet electrodes having a support framework of the sintered solid electrolytes of the invention, λ sensors or gas sensors and also fuel cells, high-temperature electrolysis cells or oxygen pump cells using the solid electrolytes of the invention are able to be more heavily loaded. The sinter activity of the mixed oxides, i.e. their ability to sinter together to give mechanically strong bodies, is very good as a result of the nanocrystalline structure of the starting materials and can be increased further by the addition of certain neutral oxides, such as aluminum oxide, without significant impairment of the conductivity.

The preferred application area of the solid electrolytes of the invention is layers or layer systems in electrochemical components. Both the individual layers and the layer systems can consist completely or partially of the solid electrolytes of the invention. Thus, the individual layers can be made of the solid electrolyte or of the solid electrolyte together with other components. The latter applies, for example, to the cermet electrodes mentioned. The layer systems mentioned can be built up completely or partially of layers consisting of the solid electrolyte of the invention or, as in the case of cermet electrodes, comprise these. For example, a solid electrolyte layer and/or one or more cermet electrodes comprising the solid electrolyte can be combined with a porous ceramic gas diffusion layer and/or with a porous catalyst layer.

Although use is made of stabilizers some of which are difficult to obtain and therefore expensive, the solid electrolytes of the invention enable components to be produced in an economic manner because the conducting layers or the cermet electrodes having a conducting support framework can, owing to the high conductivity, be correspondingly smaller.

From the point of view of manufacturing technology, it is advantageous that the solid electrolytes of the invention can be extremely well cosintered with other oxides used in gas sensor technology, e.g. conventional zirconium(IV) oxide having a coarser particle structure or containing metallic particles. Comparatively low temperatures are sufficient for this purpose. If the cation radii of the stabilizer oxide and the oxide of the tetravalent metal are significantly different, sintering temperatures as low as from 1300° to 1500° C. give sintered bodies having good mechanical properties, but these have unsatisfactory oxygen-ion conductivity. The same applies to partially stabilized oxides of tetravalent metals. If the cation radii are well matched, higher sintering temperatures are required to produce mechanically strong sintered bodies which, however, are then also well suited to use as solid electrolytes, i.e. they have good oxygen-ion conductivity. For example, the sintering temperatures for zirconium(IV) oxide stabilized with scandium(III) oxide are from 1900° to 2000° C. If, according to the invention, the starting powder is one consisting essentially of nanocrystallites, the sintoting temperatures can be considerably reduced in comparison with conventional powders having particles in the μm range, and the sintered bodies obtained under otherwise identical conditions have excellent properties both from a mechanical point of view and also in respect of the oxygen-ion conductivity. Cosintering gives strong, mechanically highly stressable bonds between the metallic or oxidic substrate and the solid electrolyte of the invention, whether as thin, oxygen-ion-conducting layer or as support framework in thin cermet electrodes.

DESCRIPTION OF THE PREFERRED EMBODIMENTS

The advantages indicated are shown by sintered solid electrolytes, which have been produced by the processes herein and can be used as a layer or layer systems as claimed.

The sintered solid electrolytes of the invention are based on oxides of tetravalent metals and stabilizer oxides. They can thus consist of these constituents or contain other additives, such as aluminum oxide which increases the sinter activity. Preferred oxides of tetravalent metals are the usual ion-conducting oxides such as zirconium(IV) oxide, hafnium(IV) oxide and cerium(IV) oxide, in each case alone or in admixture.

The stabilizers are incorporated into the crystal lattice of the oxides of tetravalent metals. The ionic radii of the cations should therefore be as similar as possible. Preferred stabilizers are the oxides of certain trivalent metals, in particular of transition group II of the Periodic Table of the Elements. Examples which maybe mentioned are scandium and also, in particular, yttrium and the oxides of the higher rare earths. For the purposes of the present invention, "higher rare earths" are those having an atomic number >64. Examples which my be mentioned are erbium(III) oxide, dysprosium (III) oxide and ytterbium(III) oxide.

The molar ratio of oxides of tetravalent metals and stabilizer required for full stabilization with maximum conductivity depends on the selected combination and can, if desired, be determined without difficulty by experiment. For zirconium(IV) oxide, the proportions of stabilizer oxide are generally >7 mol. %. For the specific combination zirconium (IV) oxide/ytterbium(III) oxide, the conductivity maximum is at from 8 to 12 mol. % of ytterbium(III) oxide. If partially stabilized solid electrolytes are desired, correspondingly less stabilizer is used. It is advisable not to exceed the optimum amount of stabilizer, since otherwise, as a result of decreasing mobility of the oxygen ions, the conductivity and, as a result of reduced sintot activity of the starting mixture, the sintered density and the mechanical strength of the sintered solid electrolytes are reduced.

An important feature of the solid electrolytes of the invention is the extraordinarily fine crystal structure of the starting powder for the shaping process. It consists essentially of nanocrystallites having a mean diameter of <100 nm, preferably from 5 to 40 nm.

Sintered solid electrolytes of the invention have, as already said, comparatively high specific conductivities. Their values depend on the composition of the solid electrolytes, the sintering conditions and naturally on the temperature. For zirconium(IV) oxide which has been stabilized with ytterbium(III) oxide, they are about one order of magnitude higher than for solid electrolytes made of coarse powder under otherwise identical conditions.

The sintered solid electrolytes of the invention are produced from the corresponding finely divided oxides and the stabilizers in a sintering process. Advantageously, the stabilized oxides are used as starting materials and are converted into an appropriately fine form, i.e. nanocrystallites. A number of suitable processes are known. Vacuum vaporization with subsequent consolidation (e.g. H. Gleiter, Phys. B1. 47 (1991), 753 ff.) is suitable in particular for the production of small amounts. Larger amounts of nanocrystallites can be produced by the following methods:

—Sol-gel processes (e.g. Sangeta et al., J. Am. Ceram. Soc. 73 (1990), page 2760 ff. "Nanometer-sized $ZrO_2$ Particles Prepared by a Sol-Emulsion-Gel Method"). This process is also suitable for joint deposition, for example of zirconium(IV) oxide and yttrium(III) oxide.
—High-energy milling (e.g. Fecht in "Nanostructured Materials" Vol. 1 No. 2, (1992)). The process is described there only for metals, but in the meantime has also been used for ceramic materials: H. Grewe, W. Schlump, EP 0 339 366.
—Spray pyrolysis (G. L. Messing et al., J. Am. Ceram. Soc., Vol. 73 (1990), page 61 ff.)
—Spark Erosion for Fine Particle Production, paper by A. E. Berkowitz, First International Conference on Nanostructured Materials, September 21–28, 1992, Cancun, Mexico.

Nanocrystallites consist of a crystallite core which in the lower size range may comprise not more than from 103 to 104 atoms and is pseudoamorphous at the periphery, i.e. has a more or less strongly disrupted lattice. The disruption is noticeable, on the one hand, in the X-ray diffraction pattern at low scattering angles by a broadening of the base of the peaks. It can, however, also be detected directly by means of SEM, TEM or by tunneling electron microscopy. Owing to the small mean diameter of the nanocrystallites, a substantial part of the stabilizing oxide is present in the pseudoamorphous, lattice-disrupted regions. The previously mentioned advantageous electrical and mechanical properties of the solid electrolytes of the invention are due to this.

The starting powders consisting "essentially" of the nanocrystallites means that small amounts of inert constituents or sintering aids such as aluminum oxide can be present.

The nanocrystals are sintered in a conventional manner to give the solid electrolytes. For the shaping process, they can be made into a paste, provided with one of the known organic binders and the paste can be formed by the thin-layer or thick-layer method. For example, the paste in combination with other functional parts, such as electrodes of metal, supports, porous or gas-impermeable protective layers, can be used to produce electrochemical components, e.g. sensors, fuel cells or pump cells. Naturally, it is also possible to produce shaped bodies, such as membranes, which are not combined with other functional parts to give components. In each case, the shaping is followed by a sintering step which leads to the sintered solid electrolyte of the invention. For this purpose, use is generally made, depending on the tetravalent metal oxide concerned and on the stabilizer oxide used, of temperatures of from about 1,000° to 1,600° C. For zirconium(IV) oxide, a sintering temperature which is both gentle and effective is about 1,200° C.

The sintering time depends in turn on the stabilized oxide and the sintering temperature. It is generally from 1 to 10 hours hold time at the maximum temperature, i.e. excluding the heating and cooling phases. Sintering is generally carried out at atmospheric pressure, but can also be carried out at superatmospheric pressure if a particularly high degree of densification is desired. Like all sintered bodies, the solid electrolytes of the invention also have a certain porosity, which is advantageous for use in those components in which the diffusion of gases plays a role.

In the sintering process, the previously mentioned pseudoamorphous structures on the surface of the nanocrystallites are frequently recognizably retained as a pseudoamorphous phase between the nanocrystallites in the microstructure of the solid-state electrolyte, even though a change in the direction of a higher degree of order would be able to take place under the sintering conditions. The sintered solid electrolytes have a nanocrystallite structure particularly when gentle sintering conditions are selected, for example temperatures of up to about 1,200° C.

It is notable, how strongly the stabilized nanocrystalline oxide bonds to any other functional parts during sintering. It is therefore extremely suitable for the cosintering technique.

What is claimed is:

1. A sintered layer system, comprising:
   an ion-conductive solid electrolyte layer which has a high oxygen ion conductivity and which is comprised of a solid electrolyte material comprising at least one oxide of tetravalent metals and at least one stabilizer oxide; and at least one functional layer which comprises a mixture of the solid electrolyte material and at least one further material, wherein the solid electrolyte material of the ion-conductive solid electrolyte layer and the solid electrolyte material of the at least one functional layer are comprised of nanocrystallites having a mean diameter of <100 nanometers.

2. The sintered layer system as claimed in claim 1, wherein the at least one functional layer is at least one cermet electrode layer.

3. The sintered layer system as claimed in claim 2, wherein the at least one cermet electrode layer is comprised of a metal constituent which is platinum.

4. The sintered layer system as claimed in claim 1, wherein the at least one stabilizer oxide is scandium(III) oxide.

5. The sintered layer system as claimed in claim 1, wherein the at least one oxide of tetravalent metals is selected from the group consisting of zirconium(IV) oxide, hafnium(IV) oxide, and cerium(IV) oxide.

6. The layer system as claimed in claim 1, wherein the sintered layer system is cosintered.

7. The sintered layer system as claimed in claim 1, wherein the nanocrystallites have a mean diameter ranging from 5 to 40 nanometers.

8. A sintered layer system, comprising:

an ion-conductive solid electrolyte layer which has a high oxygen ion conductivity and which is comprised of a solid electrolyte material comprising at least one oxide of tetravalent metals and at least one stabilizer oxide; and at least one functional layer which comprises a mixture of the solid electrolyte material and at least one further material, wherein the solid electrolyte material of the ion-conductive solid electrolyte layer and the solid electrolyte material of the at least one functional layer are comprised of nanocrystallites having a mean diameter of <100 nanometers, wherein the at least one functional layer is at least one cermet electrode layer comprised of a metal constituent which is platinum, wherein the at least one stabilizer oxide is scandium(III) oxide, wherein the at least one oxide of tetravalent metals is selected from the group consisting of zirconium(IV) oxide, hafnium(IV) oxide, and cerium(IV) oxide, and wherein the sintered layer system is cosintered.

9. The sintered layer system as claimed in claim 8, wherein the nanocrystallites have a mean diameter ranging from 5 to 40 nanometers.

* * * * *